United States Patent Office 3,337,437
Patented Aug. 22, 1967

3,337,437
PHOTOCHEMICAL PROCESS FOR PRODUCING
ALKYL SULFONATES
Clarence L. Furrow, Charles E. Stoops, and John E.
Mahan, Bartlesville, Okla., assignors to Phillips Petroleum Company, a corporation of Delaware
No Drawing. Filed June 17, 1965, Ser. No. 464,858
9 Claims. (Cl. 204—162)

This application is a continuation-in-part of copending application Ser. No. 386,773, filed July 31, 1964, now abandoned.

This invention relates to an improved process for the production of alkyl sulfonates. In another aspect, this invention relates to a process for the production of an alkyl sulfonate employing a novel initiator. In yet another aspect, this invention relates to a process for the production of alkyl sulfonates employing electro-magnetic radiant energy as an initiator and an inorganic oxidizing compound as a promoter.

There is considerable interest in the production of biodegradable detergents and research has been directed to the discovery of processes for the economical production of these biodegradable detergents. While a greater proportion of the research work in biodegradable detergents has been devoted to the preparation of alkylbenzene sulfonates wherein the alkyl group has a relatively unbranched structure, considerable research efforts have been devoted to the synthesis of alkyl sulfates, alkyl sulfonates, and the like.

A variety of processes have been proposed for the synthesis of alkyl sulfonates. These processes have generally been plagued by such difficulties as low yields and high costs of initiators. The conventional process which has received a considerable amount of attention is the reaction of an alkali metal or ammonium bisulfite with an olefin in the presence of a peroxide initiator. When employing a peroxide initiator, extreme care must be employed to select a cosolvent to utilize with water for the particular olefin which is being reacted with the bisulfite compound. Furthermore, the peroxide initiators which are utilized in such a process are of a type which are quite expensive and are not readily available in large quantities.

Accordingly, an object of our invention is to provide an improved process for the production of alkyl sulfonates.

Another object of our invention is to provide a process for the addition of a bisulfite to an alkene to produce an alkyl sulfonate in high yield.

Other objects, advantages and features of our invention will be readily apparent to those skilled in the art from the following description and the appended claims.

By our invention, we have provided a process for the production of alkyl sulfonates in high yield by the addition of a bisulfite to an alkene in the presence of ultraviolet and/or visible light and in the presence of a mixed solvent system comprising water and at least one polar organic solvent having a relatively low absorptivity for ultraviolet and/or visible light. In a preferred embodiment, we have discovered that increased yields of alkyl sulfonates are produced by employing in the reaction mixture an inorganic oxidizing agent.

Alkenes which are reacted with a bisulfite according to the process of this invention will generally contain from about 6 to about 20 carbon atoms per molecule. While the process of this invention is suitable for the reaction of straight chain and branched chain olefins with bisulfite compounds, it is particularly applicable to the reaction of bisulfite compounds with straight chain olefins, preferably 1-olefins. Some specific examples of olefins which can be reacted with bisulfite compounds according to the process of this invention include 1-hexene, 2-heptene, 1-octene, 1-decene, 3-undecene, 1-dodecene, 1-eicosene, 4-methyl-1-pentene, 2-methyl-1-pentadecene, and the like.

The bisulfite employed in the process of our invention has a formula $MHSO_3$, wherein M is selected from the group consisting of sodium, potassium, lithium, rubidium, and cesium. The concentration of the bisulfite compound in the reaction zone preferably is sufficient to provide from 1 to 1.5 moles of the bisulfite compound per mol of alkene feed to the reaction zone. The bisulfite compound can be introduced directly into the reaction zone or it can be introduced into the reaction zone as a water solution of the bisulfite compound.

The reaction is conducted in the presence of a cosolvent system comprising water and a polar organic solvent having a relatively low absorptivity for the particular electro-magnetic radiant energy employed. The polar organic solvent/water volume ratio will generally range from 0.1:1 to 2:1, while the quantity of water present in the reaction zone will generally range from 0.5 to about 10 grams of water per gram of bisulfite compound present.

Suitable polar organic solvents having a relatively low absorptivity for the electro-magnetic radiant energy of this invention and which can be employed in the cosolvent system of our invention include alcohols, ethers, amines, nitriles, and the like. Low absorptivity, as the term is herein employed, refers to the absorption of electro-magnetic radiation by the polar organic solvent to such a limited degree so as to not prevent the initiation of the alkene-bisulfite reaction by the electro-magnetic radiation. Specific examples of suitable polar organic solvents which can be employed in the process include methyl alcohol, ethyl alcohol, n-propyl alcohol, isopropyl alcohol, n-butyl alcohol, sec-butyl alcohol, isobutyl alcohol, t-butyl alcohol, n-amyl alcohol, diethyl ether, dioxane, tetrahydrofuran, trimethylamine, piperidine, and the like. t-Butyl alcohol is a preferred solvent.

The electro-magnetic rediation comprising ultraviolet and/or visible light radiation and which is employed as the initiator in the process of this invention will have a wave length generally ranging from about 1,000 to 9,000 Angstroms, preferably in the range of 2,000 to 4,000 Angstroms. The radiation dose absorbed by the alkene-bisulfite mixture will generally be from 0.001 to 1.0 Einstein, preferably from 0.01 to 0.5 Einstein. Any suitable source of these forms of light radiation can be employed, including such sources as mercury vapors, photo lamps, sun lamps, sun light, etc.

In a preferred embodiment, although not to be limited thereto, a promoting amount of a selected inorganic oxidizing agent is introduced into the reaction system to increase the yield of alkyl sulfonates produced therein. The inorganic oxidizing agent which can be employed in the process of this invention are the water-soluble compounds selected from the group consisting of nitrates, permanganates, chromates, dichromates, chlorates and rare earth metal salts in their highest oxidation state. A preferred group of oxidizing agents are the alkali metal nitrates, permanganates, chromates, dichromates and chlorates. Some specific examples of inorganic oxidizing agents which can be employed are sodium nitrate, ammonium nitrate, potassium permanganate, potassium chromate, potassium dichromate, potassium chlorate, lithium chlorate, cesium nitrate, rubidium chromate, ammonium sulfate, and other salts of rare earth metal compounds existing in their highest oxidation state, as, for example, halides, sulfates, complex salts of the elements having an atomic number up to 57 to 71, and particularly including cerium, lanthanum, samarium, gadolinium, terbium, and the like.

The amount of water-soluble inorganic oxidizing agent which is employed in the process of this invention will generally range from 0.25 to 5 grams of oxidizing agent per mol of olefin charged to the reaction zone. The water-soluble inorganic oxidizing agent can be introduced directly into the reaction zone or it can be introduced into the reaction zone in the water charged as a cosolvent.

The reaction of the olefin and bisulfite compound is conducted at a temperature ranging from the freezing point of the reaction mixture to about 100° C., preferably from the freezing point of the reaction mixture to about 50° C. The pressure will generally be autogenous, and will range from about atmospheric to about 500 p.s.i., depending upon the temperature, the reaction solvents, and the like. The time of reaction will generally range from a few minutes to 50 hours, or longer.

The reaction can be conducted either batch-wise or continuous, but it is preferred to operate batch-wise. The constituents in the reaction mixture can be introduced independently into the reaction zone or the various constituents can be premixed and introduced into the reaction zone as a mixture or mixtures.

After the reaction is complete, the reaction mixture can be subjected to an evaporation step wherein water and the organic solvent are separated from the product alkyl sulfonate. Alkyl sulfonate yields of at least 75 percent are obtainable by the inventive process. The "yield" as the term is herein employed is the weight percent of olefin feed charged to the reaction zone converted to the alkyl sulfonate.

The alkyl sulfonates prepared by the process of this invention have wide utility, particularly in the detergent and wetting agent field. For example, the reaction of dodecene with sodium bisulfite according to the process of this invention produces sodium dodecyl sulfonate, an excellent detergent material, in good yields.

The following specific examples are presented to illustrate the objects and advantages of the invention of employing ultraviolet and/or visible light radiation as an initiator and selected inorganic oxidizing agents as promoters in the reaction of an alkene with a bisulfite compound.

*Example I*

A series of runs was conducted in which sodium bisulfite was reacted with 1-dodecene in the presence of water and a cosolvent as indicated in Table I. In these runs, 67.2 grams (0.4 mol) of 1-dodecene, 52.0 grams (0.5 mol) of sodium bisulfite, 280 milliliters of water and 280 milliliters of a cosolvent as indicated in Table I were charged to a reaction flask into which a quartz thimble was suspended which projected into the reaction mixture. The flask was equipped with a stirrer. A 100 watt high pressure mercury vapor lamp was inserted into the thimble, the lamp turned on and the stirrer started. The radiation and stirring of the reaction mixture was conducted for a period of 24 hours during which time the reaction mixture was maintained at a temperature ranging from 35 to 39° C. At the end of this period, the reaction mixture was withdrawn from the reaction flask and analyzed for dodecyl sulfonate content by ASTM method D-1681-59T. The results of these runs are expressed below as Table I.

TABLE I

| Run | Cosolvent | Yield of Dodecyl Sulfonate, percent of Theoretical |
|---|---|---|
| 1 | Tert-butyl alcohol | 75.7 |
| 2 | n-Butyl alcohol | 14.4 |
| 3 | n-Propyl alcohol | 13.2 |
| 4 | Sec-butyl alcohol | 6.5 |
| 5 | Dioxane | 6.5 |
| 6 | Isobutyl alcohol | 5.7 |
| 7 | Acetonitrile | 5.5 |
| 8 | Isopropyl alcohol | 3.6 |
| 9 | Ethyl alcohol | 3.1 |

As illustrated above, particularly high yields of dodecyl sulfonate are obtainable when employing tert-butyl alcohol as a cosolvent.

*Example II*

A series of runs was conducted according to the procedure of Example I with the exception that tert-butyl alcohol was the only cosolvent employed, and the temperature and time were varied as illustrated below in Table II. The results of these runs are expressed below in Table II.

TABLE II

| Run | Time, Hours | Temp., ° C. | Grams Crude Dodecyl Sulfonate Discovered | Wt. percent Dodecyl Sulfonate in Crude Product | Grams Dodecyl Sulfonate Produced | Yield of Dodecyl Sulfonate, percent of Theoretical |
|---|---|---|---|---|---|---|
| 1 | 24 | 36 | 105.9 | 77.9 | 82.3 | 75.7 |
| 10 | 24 | 77.5 | 54.7 | 31.5 | 17.2 | 15.8 |
| 11 | 48 | 78 | 78.3 | 61.0 | 47.8 | 44.0 |

A comparison of the results obtained when employing different reaction temperatures and employing different reaction times illustrate that significantly higher yields of dodecyl sulfonate are obtainable when employing lower reaction temperatures and that a longer reaction time at a given reaction temperature produces higher yields.

*Example III*

A further series of runs was conducted by the method of Example I except that the runs were conducted at the reflux temperature of the reaction mixture for 48 hours using an alcohol as the cosolvent. The results of these runs are expressed below in Table III.

TABLE III

| Run | Alcohol Used | Temp., ° C. | Yield of Dodecyl Sulfonate, percent of Theoretical |
|---|---|---|---|
| 12 | Isopropyl alcohol | 79 | 13.3 |
| 13 | Methyl alcohol | 75 | 5.2 |

*Example IV*

A series of runs was conducted in which sodium bisulfite was reacted with 1-dodecene in the presence of a cosolvent system comprising water and tert-butyl alcohol and employing the electro-magnetic radiant energy transmitted by 16 Sylvania daylight fluorescent lamps (F8T5/D). In these runs, illustrated below in Table IV, 40.4 grams (0.24 mol) of 1-dodecene, 31.2 grams (0.3 mol) of sodium bisulfite, 170 milliliters of water and 170 milliliters of tert-butyl alcohol were charged to a reaction flask into which a quartz thimble was suspended which projected into the reaction mixture. The flask was equipped with a stirrer. The radiation and stirring of the reaction mixture was conducted for a period of 4.5 hours during which time the reaction mixture was maintained at a temperature of 33° C. and exposed to the irradiation by the 16 Sylvania daylight lamps. At the end of this period, the reaction mixture was withdrawn from the reaction flask and analyzed for dodecyl sulfonate content by ASTM method D-1681-59T. The results of these runs are expressed below in Table IV.

TABLE IV

| Run | Yield of Dodecyl Sulfonate, percent of theoretical |
|---|---|
| 14 | 26.1 |
| 15 | 22.2 |
| 16 | 21.3 |
| 17 | 22.4 |

The above runs clearly demonstrate the effectiveness of visible light as an initiator in the production of alkyl sulfonates.

Example V

A series of runs was conducted in which sodium bisulfite was reacted with 1-dodecene in the presence of water and tert-butyl alcohol. In these runs, 40.4 grams (0.24 mol) of 1-dodecene, 31.2 grams (0.3 mol) of sodium bisulfite, 170 milliliters of water and 170 milliliters of tert-butyl alcohol were charged to a reaction flask into which a quartz thimble was suspended which projected into the reaction mixture. The flask was equipped with a stirrer and was placed on a bench to permit maximum exposure to room light. The radiation and stirring of the reaction mixture was conducted for a period of 4.5 hours during which time the reaction mixture was maintained at a temperature of 33° C. At the end of this period, the reaction mixture was withdrawn from the reaction flask and analyzed for dodecyl sulfonate content by ASTM method D–1681–59T. The results of these runs are expressed below in Table V.

TABLE V

| Run | Yield of Dodecyl Sulfonate, percent of theoretical |
|---|---|
| 18 | 16.8 |
| 19 | 19.4 |
| 20 | 18.8 |

The above results indicate the effectiveness of visible light (room light) to initiate the reaction mixture so as to produce significant quantities of dodecyl sulfonate.

Example VI

A series of runs was conducted in which sodium bisulfite was reacted with 1-dodecene in the presence of a mixed solvent system comprising tert-butyl alcohol and water in the presence of ultraviolet light and in the presence or absence of an inorganic oxidizing agent as indicated below in Table VI. In these runs, 40.4 grams (0.24 mol) of 1-dodecene, 31.2 grams (0.3 mol) of sodium bisulfite, 168 ml. of tert-butyl alcohol, 168 ml. of water and 0 or 0.5 gram of inorganic oxidizing agent were charged to a flask fitted with a stirrer and irradiated with ultraviolet light of either 3500 Angstrom wave length or 2537 Angstrom wave length for 4.5 hours at 33° C. while stirring. At the end of the reaction time, the yield of sodium dodecyl sulfonate was determined by ASTM method D–1681–59T, using cetyl trimethyl ammonium bromide as the titrant. The results of these runs are presented below in Table VI.

TABLE VI

| Run | Ultraviolet wave length, Angstroms | Oxidizing Agent | Grams of Oxidizing Agent | Yield of Dodecyl Sulfonate, percent of theoretical |
|---|---|---|---|---|
| 21 | 3,500 | Potassium permanganate | 0.5 | 68.1 |
| 22 | 3,500 | None | 0 | 46.3 |
| 23 | 2,537 | Ammonium nitrate | 0.5 | 23.4 |
| 24 | 2,537 | Cerium ammonium sulfate | 0.5 | 16.3 |
| 25 | 2,537 | None | 0 | 11.9 |

By comparing above runs 21, 23 and 24 with control runs 22 and 25, it is readily evident that the presence of the above oxidizing agent provides a significantly greater yield of product dodecyl sulfonate than in those control runs in which no inorganic oxidizing agent was employed.

As will be evident to those skilled in the art, various modifications of this invention can be made, or followed, in the light of the foregoing disclosure, without departing from the spirit or scope thereof.

We claim:
1. A process for the production of an alkyl sulfonate which comprises reacting in a reaction zone an alkene with a bisulfite of the formula $MHSO_3$, wherein M is selected from the group consisting of sodium, potassium, lithium, rubidium and cesium, said reacting conducted in the presence of an electro-magnetic radiation having a wave length in the range of 1000–9000 Angstroms and in the presence of a mixed solvent system comprising water and a polar organic solvent having a relatively low absorptivity for the electro-magnetic radiant energy employed.

2. The process of claim 1 wherein the wave length of the electro-magnetic radiation employed is in the range of 2000–4000 Angstroms.

3. The process of claim 1 wherein the concentration of said bisulfite in said reaction zone will range from about 1–1.5 mols per mol of alkene feed to said reaction zone, the concentration of water present in said reaction zone will range from about 0.5 to about 10 grams of water per gram of said bisulfite present, the volume ratio of said polar organic solvent to said water in said reaction zone will range from about 0.1:1 to 2:1, and the reaction temperature is maintained in the range from about the freezing point of the reaction mixture to about 100° C.

4. The process of claim 3 wherein said polar organic solvent is tert-butyl alcohol.

5. The process of claim 4 wherein said bisulfite is sodium bisulfite.

6. The process of claim 4 wherein said electro-magnetic radiation has a wave length in the range of from 2000–4000 Angstroms.

7. A process for the production of an alkyl sulfonate which comprises reacting in a reaction zone an alkene with a bisulfite of the formula $MHSO_3$ wherein M is selected from the group consisting of sodium, potassium, lithium, rubidium and cesium, said reacting conducted in the presence of electro-magnetic radiation having a wave length in the range of 1000–9000 Angstroms, said reacting further conducted in the presence of an inorganic oxidizing water-soluble compound selected from the group consisting of nitrates, permanganates, chromates, dichromates, chlorates and rare earth metal salts in their highest oxidation states and in the presence of a mixed solvent system comprising water and a polar organic solvent having a low absorptivity for the electro-magnetic radiant energy employed.

8. The process of claim 7 wherein the concentration of said inorganic oxidizing compound in said reaction zone is in the range from 0.25–5 grams per mol of alkene introduced into said reaction zone.

9. The process of claim 8 wherein said inorganic oxidizing compound is selected from the group consisting of potassium permanganate, ammonium nitrate and cerium ammonium sulfate.

References Cited

UNITED STATES PATENTS 2,398,426  4/1946  Hanford _____ 204—162
3,048,531  8/1962  Stogryn et al. _____ 204—162

JOHN H. MACK, *Primary Examiner.*

H. S. WILLIAMS, *Assistant Examiner.*